(12) United States Patent
Musha et al.

(10) Patent No.: US 11,933,640 B2
(45) Date of Patent: Mar. 19, 2024

(54) MAGNETIC LINEAR POSITION DETECTOR

(71) Applicant: Mitsubishi Electric Corporation, Tokyo (JP)

(72) Inventors: Takeshi Musha, Tokyo (JP); Yoshinao Tatei, Tokyo (JP); Hisanori Torii, Tokyo (JP); Makoto Higashino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/791,562

(22) PCT Filed: Mar. 10, 2020

(86) PCT No.: PCT/JP2020/010357
§ 371 (c)(1),
(2) Date: Jul. 8, 2022

(87) PCT Pub. No.: WO2021/181535
PCT Pub. Date: Sep. 16, 2021

(65) Prior Publication Data
US 2023/0033559 A1    Feb. 2, 2023

(51) Int. Cl.
*G01D 5/14* (2006.01)

(52) U.S. Cl.
CPC .................... *G01D 5/145* (2013.01)

(58) Field of Classification Search
CPC .................................................. G01D 5/145
See application file for complete search history.

(56) References Cited

U.S. PATENT DOCUMENTS

| 5,518,824 A | 5/1996 | Funhoff et al. |
| 5,907,200 A * | 5/1999 | Chitayat ............... G01D 5/145 318/135 |

(Continued)

FOREIGN PATENT DOCUMENTS

| JP | H07-004987 A | 1/1995 |
| JP | 7-114987 A | 5/1995 |

(Continued)

OTHER PUBLICATIONS

International Search Report and Written Opinion dated Jun. 9, 2020, received for PCT Application PCT/JP2020/010357, filed on Mar. 10, 2020, 9 pages including English Translation.

(Continued)

*Primary Examiner* — Reena Aurora
(74) *Attorney, Agent, or Firm* — XSENSUS LLP

(57) ABSTRACT

A magnetic linear position detector includes a stator and a mover that is movable along a first direction with respect to the stator. One of the stator and the mover includes a magnetic detector, and the other of the stator and the mover includes a magnet. The magnet has a first face facing the magnetic detector, and the first face is provided alternately with N poles and S poles along the first direction. The magnet includes a first region and a second region provided on each side of the first region along the first direction. In the first region, a length along a second direction perpendicular to the first face is constant. In the second region, a length along the second direction is different from the length in the first region.

12 Claims, 5 Drawing Sheets

(56) References Cited

U.S. PATENT DOCUMENTS

| | | | |
|---|---|---|---|
| 8,497,643 B2 | 7/2013 | Takagi | |
| 11,163,024 B2* | 11/2021 | Chowdhury | ......... G01R 33/091 |
| 2011/0109252 A1 | 5/2011 | Takagi | |
| 2015/0345990 A1* | 12/2015 | David | ................ G01D 5/24438 |
| | | | 324/207.2 |
| 2019/0020234 A1* | 1/2019 | Tangudu | .................. G01B 7/30 |
| 2020/0149924 A1* | 5/2020 | Welsch | .................. H02K 15/08 |

FOREIGN PATENT DOCUMENTS

| | | |
|---|---|---|
| JP | 2003-70225 A | 3/2003 |
| JP | 2004-101312 A | 4/2004 |
| JP | 2006-234846 A | 9/2006 |
| JP | 2011-101552 A | 5/2011 |
| JP | 2011-232060 A | 11/2011 |
| JP | 2013-238485 A | 11/2013 |

OTHER PUBLICATIONS

Notice of Reasons for Refusal dated Sep. 29, 2020, received for JP Application 2020-544551, 6 pages including English Translation.
Decision to Grant dated Dec. 15, 2020, received for JP Application 2020-544551, 5 pages including English Translation.
Office Action dated Jan. 10, 2023, in corresponding Chinese patent Application No. 202080097917.1, 19 pages.
Office Action dated May 24, 2023 in corresponding Chinese Patent Application No. 202080097917.1 and Machine English translation of the summary thereof, 11 pages.
Office Action dated Jul. 18, 2023 in Chinese Patent Application No. 202080097917.1. with machine English translation of summary thereof, 8 pages.

\* cited by examiner

MAGNETIC LINEAR POSITION DETECTOR

CROSS-REFERENCE TO RELATED APPLICATION

The present application is based on PCT filing PCT/JP2020/010357, filed Mar. 10, 2020, the entire contents of which are incorporated herein by reference.

FIELD

The present disclosure relates to a magnetic linear position detector capable of detecting a position of a mover that moves linearly.

BACKGROUND

There are known magnetic linear position detectors capable of detecting a position of a mover that moves linearly. In a magnetic linear position detector, one of a mover and a stator is provided with a magnetic detector, and the other is provided with a magnet. The magnet is provided with S poles and N poles that are alternately arranged along a moving direction of the mover. The magnetic detector is an element that converts a change in a magnetic field received from the magnet into an electric signal, such as a voltage.

In the magnet having the alternately arranged S poles and N poles, the magnetic flux distribution generated from a magnetic pole at each end is different from the magnetic flux distribution generated from magnetic poles other than the end. For example, some magnetic lines of force generated from the N pole of the magnetic pole at the end is directed to the S pole which is the rear face of the magnetic pole at the end since there is no other magnetic pole on one side. Meanwhile, the magnetic lines of force generated from the N poles of the magnetic poles other than the end are directed to the S poles of the adjacent magnetic poles. This difference causes a difference in magnetic flux distribution.

Since the magnetic flux distribution is different between the magnetic pole at each end and the magnetic poles other than the end, the magnetic field received by the magnetic detector at the magnetic pole at the end and the magnetic field received by the magnetic detector at the magnetic poles other than the end are unbalanced, which can cause the accuracy of position detection near the end to be lowered, and the position detection result near the end needs to be corrected.

Patent Literature 1 discloses a configuration in which a width of a magnetic pole is narrowed at each end of a magnet to uniformize a magnetic flux distribution.

CITATION LIST

Patent Literature

Patent Literature 1: Japanese Patent Application Laid-open No. 2011-101552

SUMMARY

Technical Problem

From the viewpoint of improving the degree of freedom in designing magnetic linear position detectors, it is desirable to have other configurations capable of uniformizing the magnetic flux distribution in addition to the configuration with a narrower width of a magnetic pole at each end of a magnet.

The present disclosure has been made in view of the above, and an object of the present disclosure is to obtain a magnetic linear position detector capable of uniformizing the magnetic flux distribution between each end of a magnet and a position other than the end.

Solution to Problem

In order to solve the above problem and achieve the object, the present disclosure includes a stator and a mover that is movable along a first direction with respect to the stator. One of the stator and the mover includes a magnetic detector, and the other of the stator and the mover includes a magnet. The magnet has a first face facing the magnetic detector, and the first face is provided alternately with N poles and S poles along the first direction. The magnet includes a first region and a second region provided on each side of the first region along the first direction. In the first region, a length of the magnet along a second direction perpendicular to the first face is constant. In the second region, a length of the magnet along the second direction is different from the length of the magnet along the second direction in the first region.

Advantageous Effects of Invention

A magnetic linear position detector according to the present disclosure has an effect of being capable of uniformizing the magnetic flux distribution between each end of a magnet and a position other than the end.

DESCRIPTION OF EMBODIMENTS

Hereinafter, a magnetic linear position detector according to an embodiment of the present disclosure is described in detail with reference to the drawings. Note that, this disclosure is not limited by the embodiments.

First Embodiment

Figure 1:
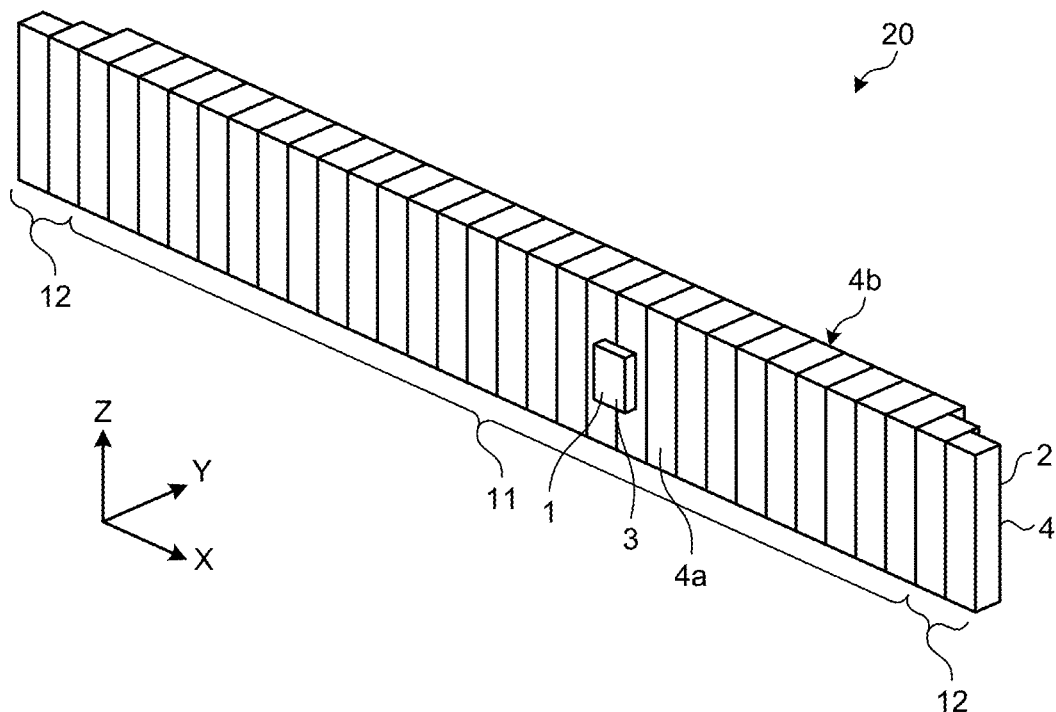
FIG. 1 is a perspective view illustrating a schematic configuration of a magnetic linear position detector according to a first embodiment.

FIG. 1 is a perspective view illustrating a schematic configuration of a magnetic linear position detector according to a first embodiment. A magnetic linear position detector 20 includes a stator 1 and a mover 2. The mover 2 is linearly movable with respect to the stator 1 in the direction along an X-axis illustrated in FIG. 1. The direction along the X axis is a first direction.

A magnetic detector 3 is attached to the stator 1. The mover 2 is provided with a magnet 4. The magnetic detector 3 is an element that converts a change in a magnetic field received from the magnet 4 into an electric signal, such as a voltage. The magnetic detector 3 is, for example, a Hall element or a Hall IC.

In the magnetic linear position detector 20, the magnetic field received by the magnetic detector 3 changes as the magnet 4 moves in the direction along the X axis. This displacement amount is converted into an output change of an electric signal by the magnetic detector 3, and a relative position between the magnet 4 and the magnetic detector 3 is calculated by a calculation unit (not illustrated).

At this time, the magnetic detector 3 is generally constituted by two or more elements whose phases differ by 90°, and the relative position between the magnet 4 and the magnetic detector 3 is calculated by performing $Tan^{-1}$ operation on a sine wave and a cosine wave output from each element.

The magnet 4 has a first face 4a facing the magnetic detector 3. Note that a Y axis perpendicular to the first face 4a is defined. The direction along the Y axis is a second direction. In addition, a Z axis perpendicular to the X axis and the Y axis is defined. In the following description, the direction along the X axis is referred to as a width direction, and the direction along the Y axis is referred to as a thickness direction.

Figure 2:
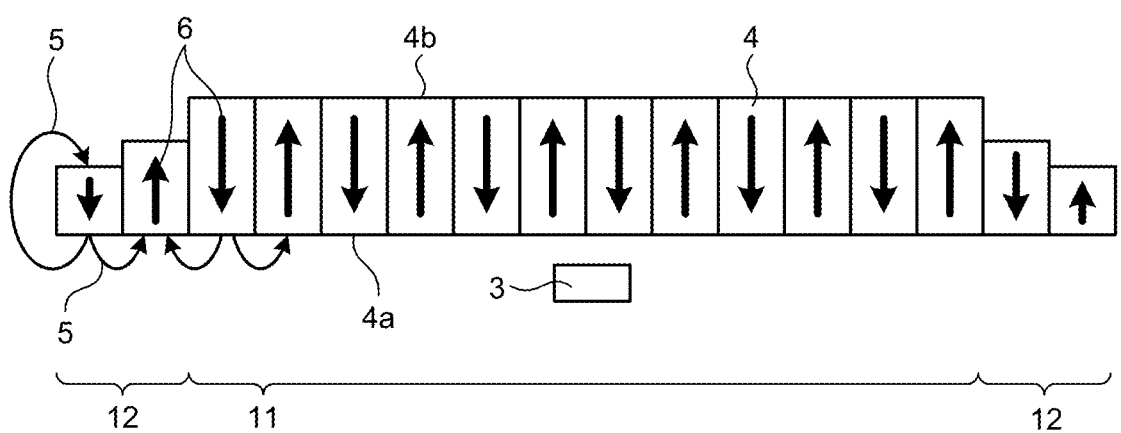
FIG. 2 is a diagram of the magnetic linear position detector according to the first embodiment as viewed along a Z axis.

FIG. 2 is a diagram of the magnetic linear position detector according to the first embodiment as viewed along the Z axis. The first face 4a of the magnet 4 is provided alternately with N poles and S poles along the width direction. Each arrow 6 on the magnet 4 in FIG. 2 indicates the direction of the internal magnetization of the magnet after magnetization. The tip of each arrow 6 indicates the N pole. Therefore, the magnetic pole on the first face 4a at the leftmost end in the sheet of FIG. 2 is the N pole. In addition, the magnetic pole on the first face 4a at the rightmost end in the sheet of FIG. 2 is the S pole. In FIG. 2, each arrow 5 indicates a magnetic line of force generated from the magnet 4.

The magnet 4 includes: a first region 11; and a second region 12 provided on each side of the first region 11 along the width direction. The first region 11 includes a plurality of magnetic poles. One second region 12 includes a plurality of magnetic poles. The first face 4a of the magnet 4 is a flat face. On the other hand, a portion that is a second face 4b, which is the rear face of the first face 4a, and included in each second region 12 is provided with a stair-like step.

In each second region 12, the length along the thickness direction from the magnetic pole on the first region 11 side to the magnetic pole at the end along the width direction is gradually shortened for each magnetic pole. As a result, as described above, the stair-like step is provided in the portion that is the second face 4b of the magnet 4 and included in each second region 12.

In other words, in each second region 12, the length along the thickness direction of the magnet 4 is shorter than the length along the thickness direction in the first region 11. In the example illustrated in FIGS. 1 and 2, two magnetic poles are included in one second region 12. For example, when the length in the thickness direction in the first region 11 is t, the length in the thickness direction of the magnetic pole at the farthest end is 0.5t, and the length in the thickness direction of the magnetic pole next to it is 0.75t. Note that one second region 12 may include one magnetic pole or three or more magnetic poles.

Figure 3:
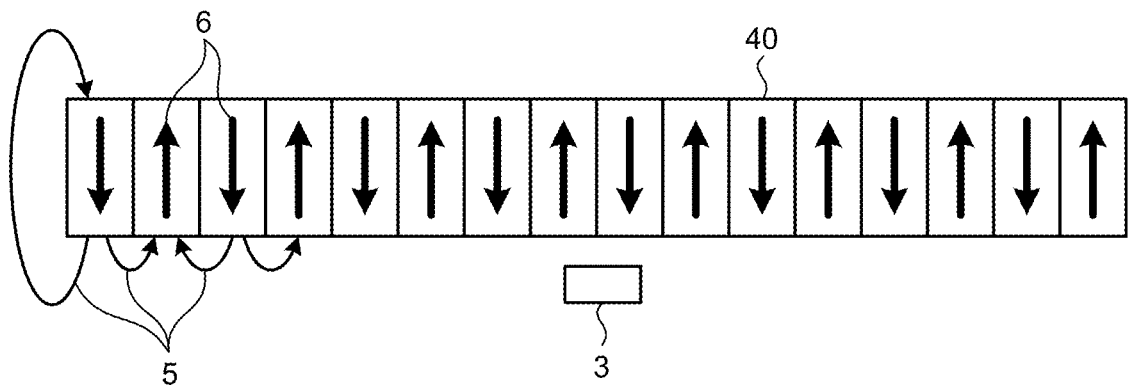
FIG. 3 is a diagram of the magnetic linear position detector according to a comparative example as viewed along the Z axis.
Figure 3:
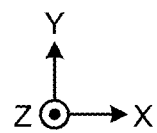
Figure 4:
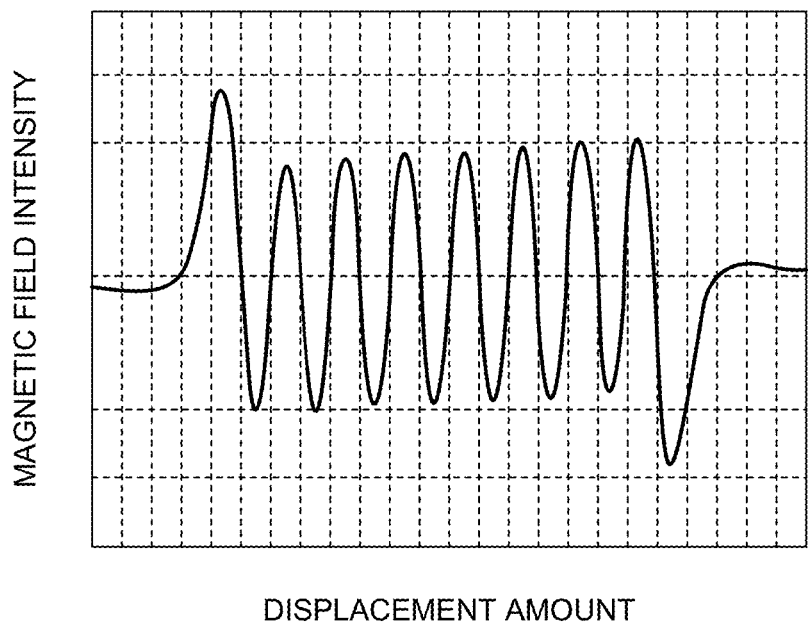
FIG. 4 is a diagram illustrating the magnetic field intensity sensed by a magnetic detector of the magnetic linear position detector according to the comparative example.

FIG. 3 is a diagram of the magnetic linear position detector according to a comparative example as viewed along the Z axis. In FIG. 3, the magnetic lines of force are indicated by the arrows 5 that do not overlap the magnet 40. FIG. 4 is a diagram illustrating the magnetic field intensity sensed by the magnetic detector of the magnetic linear position detector according to the comparative example. In FIG. 4, the horizontal axis represents the displacement amount of a magnet 40, and the vertical axis represents the magnetic field intensity in the direction along the Y axis, which is the sensing direction of the magnetic detector 3.

In the magnet 40 in the comparative example, the length in the thickness direction is constant in the entire region. Since magnetic poles other than the end of the magnet 40 along the width direction have other magnetic poles on both sides of them, the magnetic lines of force generated from the N poles other than the end are directed to the adjacent S poles. On the other hand, since the magnetic pole at each end has no adjacent magnetic pole on one side of it, the magnetic line of force generated from the N pole flows through the air toward the S pole on the rear side.

As a result, in the magnet 40 in the comparative example, the loops of the magnetic lines of force increase at both ends as illustrated in FIG. 3, and the magnetic field intensity increases as illustrated in FIG. 4. Therefore, when $Tan^{-1}$ operation is performed on the sine wave and the cosine wave by the magnetic detector 3, an error occurs in the detection result of the relative position between the magnet 40 and the magnetic detector 3 due to the unbalance of the amplitudes of the sine wave and the cosine wave.

Referring back to FIG. 2, in the magnet 4 according to the first embodiment, since the length along the thickness direction of the magnetic poles is shortened in each second region 12 provided on both sides of the first region 11, the magnetic field intensity in the direction along the Y axis at the end of the magnet 4 is suppressed.

Figure 5:
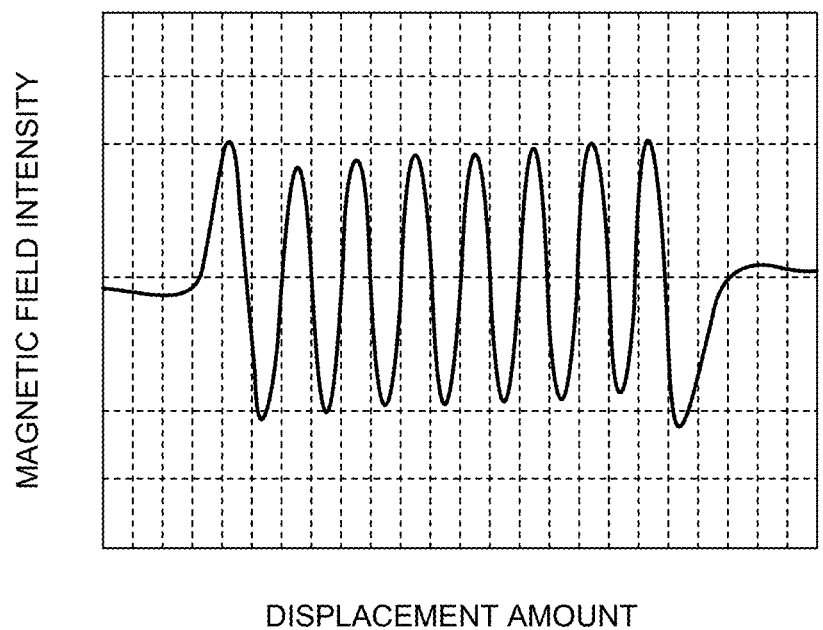
FIG. 5 is a diagram illustrating the magnetic field intensity sensed by the magnetic detector of the magnetic linear position detector according to the first embodiment.

FIG. 5 is a diagram illustrating the magnetic field intensity sensed by the magnetic detector of the magnetic linear position detector according to the first embodiment. In FIG. 5, the horizontal axis represents the displacement amount of the magnet 4, and the vertical axis represents the magnetic field intensity in the direction along the Y axis, which is the sensing direction of the magnetic detector 3. The magnetic field intensity in FIG. 5 also shows that the magnetic field intensity in the direction along the Y axis at each end of the magnet 4 is suppressed. As a result, the magnetic linear position detector 20 according to the first embodiment can improve the position detection accuracy, since the magnetic flux distribution is uniformized over the entire region in the width direction of the magnet 4.

The reason that the magnetic field intensity is suppressed as the length along the thickness direction is shortened at each end of the magnet 4 is due to the following two factors. The first factor is a decrease in magnetic force simply due to the reduction in magnet volume at each end of the magnet 4. The second factor is a decrease in magnetic force due to the reduction in the loop size of the magnetic lines of force from the N pole to the S pole at each end. This means that range of the decrease in the magnetic force increases as the distance between the first face 4a of the magnet 4 and the magnetic detector 3 widens. That is, according to the second factor, the optimum value of the length along the thickness direction of the magnet 4 in each second region 12 is determined depending on the distance between the first face 4a of the magnet 4 and the magnetic detector 3.

One end and the other end along the width direction of magnet 4 have different poles. Specifically, the pole on the first face 4a at the left end in the sheet of FIG. 2 is the N pole, and the pole on the first face 4a at the right end is the S pole. In this manner, the number of N poles and the number of S poles can be the same in the entire magnet 4. As a result, it is possible to eliminate the offset due to the difference in the number of poles to detect the relative position between the magnet 4 and the magnetic detector 3 with higher accuracy.

Figure 6:
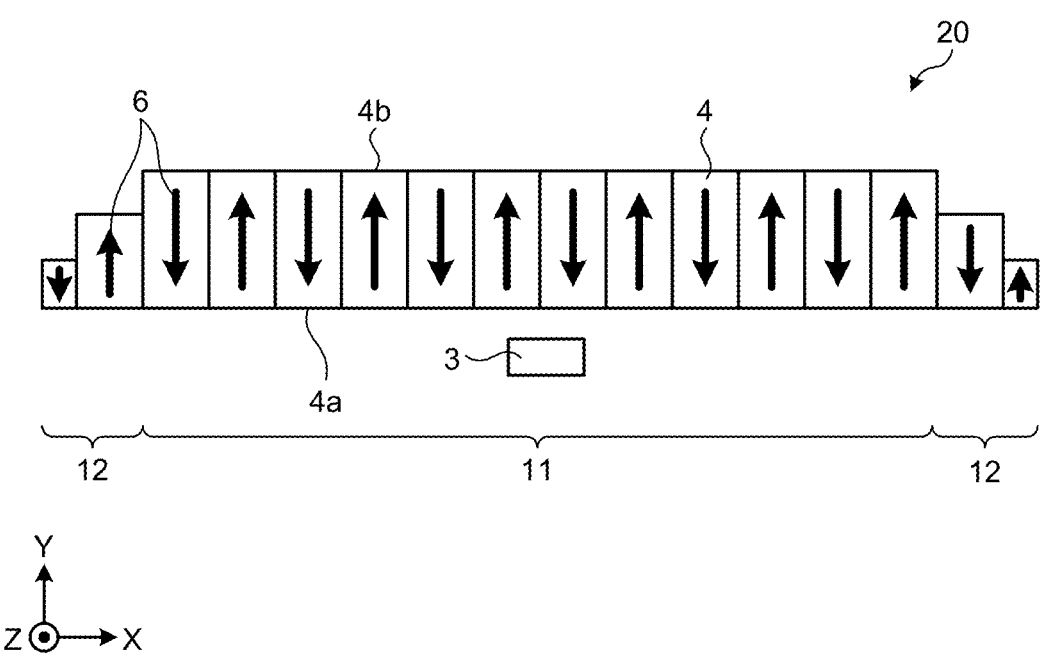
FIG. 6 is a diagram of the magnetic linear position detector according to a first modified example of the first embodiment as viewed along the Z axis.

FIG. 6 is a diagram of the magnetic linear position detector according to a first modified example of the first embodiment as viewed along the Z axis. In the magnet 4 in the first modified example, the length of the magnetic poles in the width direction is shortened in each second region 12 as the distance from the first region 11 in the width direction increases.

In the configuration illustrated as the comparative example, the loop of the magnetic line of force is large at the end of the magnet 40 as illustrated in FIG. 3. This causes the magnetic field intensity to increase at both ends of the magnet 40 and the width of the waveform in the horizontal axis direction to increase as illustrated in FIG. 4.

As illustrated in FIG. 5, by shortening the length in the thickness direction of the magnet 4 in the second regions 12, the magnetic field intensity at both ends of the magnet 4 is suppressed, and the width of the waveform in the horizontal axis direction is also narrowed. However, the width of the waveform in the horizontal axis direction is not narrowed to the same width as the waveform of the center portion where the first region 11 is provided.

When only the length in the thickness direction of the magnet 4 is used as a parameter of the magnetic force control to uniformize the magnetic forces at the center portion and the ends: the width of the waveform becomes wider at the ends if the magnetic forces are to be uniformized; and the magnetic field intensity at the ends becomes lower than that at the center portion if the width of the waveform is to be uniformized. Therefore, when only the length in the thickness direction of the magnet 4 is used as a parameter of the magnetic force control, it is difficult to uniformize both the magnetic field intensity and the width of the waveform.

In the first modified example, in addition to the length in the thickness direction of the magnet 4, the length in the width direction is also used as a parameter. In the second regions 12 that are the ends, the width of the waveform is narrowed by making the length in the width direction of the magnetic poles shorter than that in the first region 11; and the magnetic field intensity and the width of the waveform are uniformized between the center portion and the ends of the magnet 4.

By uniformizing the magnetic field intensity and the width of the waveform between the center portion and the ends of the magnet 4, the magnetic flux density can be further uniformized, and the accuracy of position detection can be further improved. Note that it is not necessary to shorten the length in the width direction of all the magnetic poles included in the second regions 12, and only the length in the width direction of the magnetic poles at the most ends along the width direction may be shortened.

Figure 7:
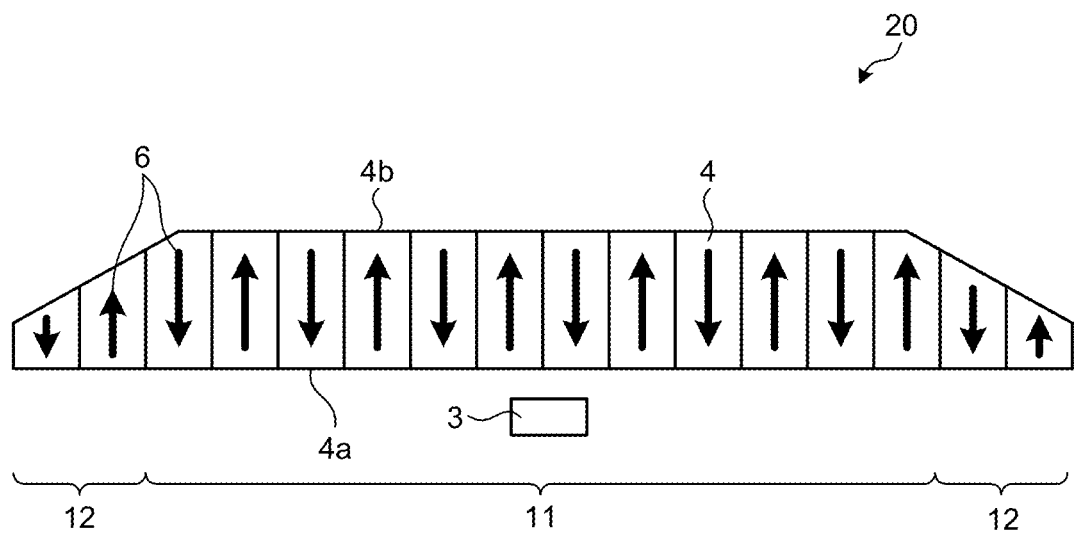
FIG. 7 is a diagram of the magnetic linear position detector according to a second modified example of the first embodiment as viewed along the Z axis.
Figure 7:
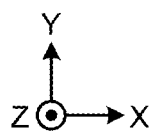

FIG. 7 is a diagram of the magnetic linear position detector according to a second modified example of the first embodiment as viewed along the Z axis. In the magnet 4 in the second modified example, each second region 12 has a tapered portion in which the length along the thickness direction becomes smoothly shorter as the distance from the magnetic pole on the first region 11 side increases.

In the magnet 4 in the second modified example, by smoothly shortening the length along the thickness direction in the second regions 12, the magnetic field intensities at the ends and the center portion are uniformized to improve the accuracy of position detection. In addition, the magnetic lines of force are perpendicular to the surface of the magnet 4 at a part where the magnetic lines of force is generated from the magnet 4 or entering the magnet 4. Therefore, the loop shape of the magnetic lines of force and the like can be controlled by the inclination angle of the tapered portions.

Therefore, in the second modified example, in addition to the length in the thickness direction of the magnet 4, the inclination angle of the surface can also be used as a parameter of the magnetic force control. As a result, the magnetic field intensity and the width of the waveform are uniformized between the center portion and the ends of the magnet 4, the accuracy of position detection can be further improved.

Note that, similarly to the first modified example, the length in the width direction of the magnetic poles in the second regions 12 may be shortened to further improve the accuracy of the position detection.

Figure 8:
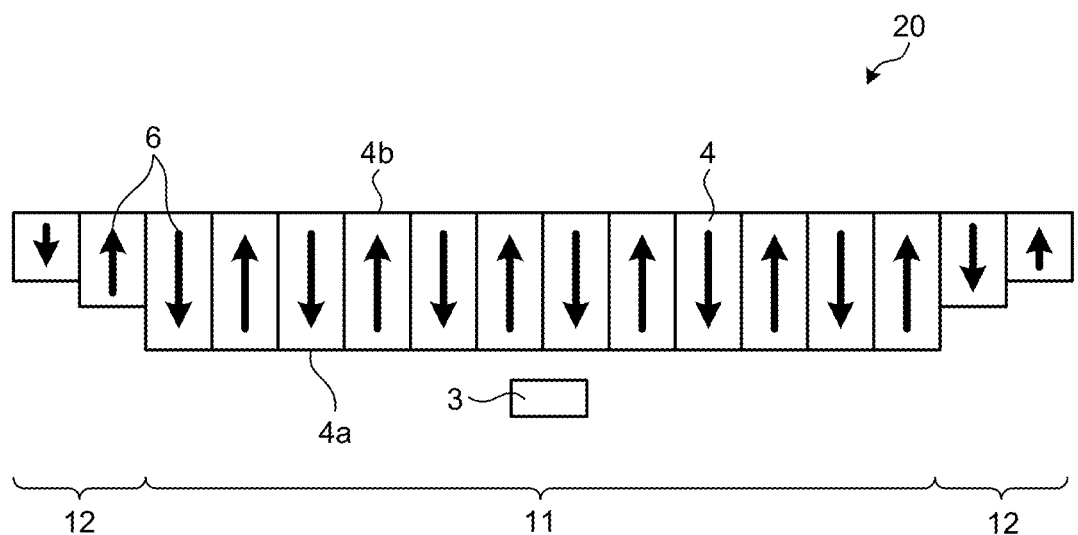
FIG. 8 is a diagram of the magnetic linear position detector according to a third modified example of the first embodiment as viewed along the Z axis.
Figure 8:
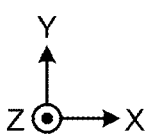

FIG. 8 is a diagram of the magnetic linear position detector according to a third modified example of the first embodiment as viewed along the Z axis. In the magnet 4 in the third modified example, the second face 4b is a flat face. In addition, by providing a stair-like step on the first face 4a, the length along the thickness direction in each second region 12 is made shorter than the length along the thickness direction in the first region 11.

With this configuration, the magnetic field intensities are uniformized between the center portion and the ends, and the accuracy of position detection can be improved. When the first face 4a is collectively magnetized using the magnetizing yoke, the first face 4a in the second regions 12 is farther away from the magnetizing yoke than the first face 4a in the first region 11.

Therefore, the magnetization rates are different between the first region 11 and the second regions 12. More specifically, the magnetization rate in the second regions 12 is smaller than that in the first region 11. Therefore, in the third modified example, by providing the step on the first face 4a, in addition to the length in the thickness direction of the magnetic poles, the magnetization rate can also be used as a parameter of the magnetic force control. As a result, the magnetic field intensity and the width of the waveform are uniformized between the center portion and the ends of the magnet 4, the accuracy of position detection can be further improved.

Figure 9:
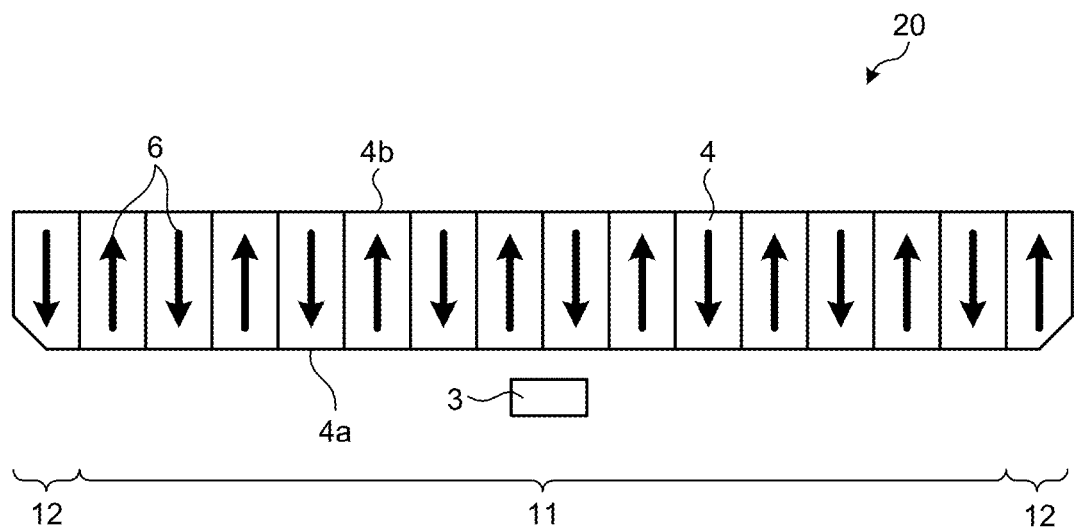
FIG. 9 is a diagram of the magnetic linear position detector according to a fourth modified example of the first embodiment as viewed along the Z axis.
Figure 9:
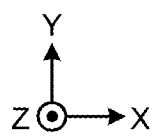

FIG. 9 is a diagram of the magnetic linear position detector according to a fourth modified example of the first embodiment as viewed along the Z axis. In the magnet 4 in the fourth modified example, the second regions 12 are provided at the magnetic poles provided at the most ends in the width direction. In the magnetic poles provided at the most ends in the width direction, corner portions on the first face 4a side are chamfered.

By chamfering at the ends, the length along the thickness direction can be shortened, and the magnetic field intensity can be suppressed. In addition, similarly to the second modified example illustrated in FIG. 7, the loop shape of the magnetic lines of force and the like can be controlled by the inclination angle of the chamfered portions. Therefore, in the fourth modified example, in addition to the length in the thickness direction of the magnet 4, the inclination angle of the chamfered portions can also be used as a parameter of the magnetic force control. As a result, the magnetic field intensity and the width of the waveform are uniformized between the center portion and the ends of the magnet 4, the accuracy of position detection can be further improved.

Figure 10:
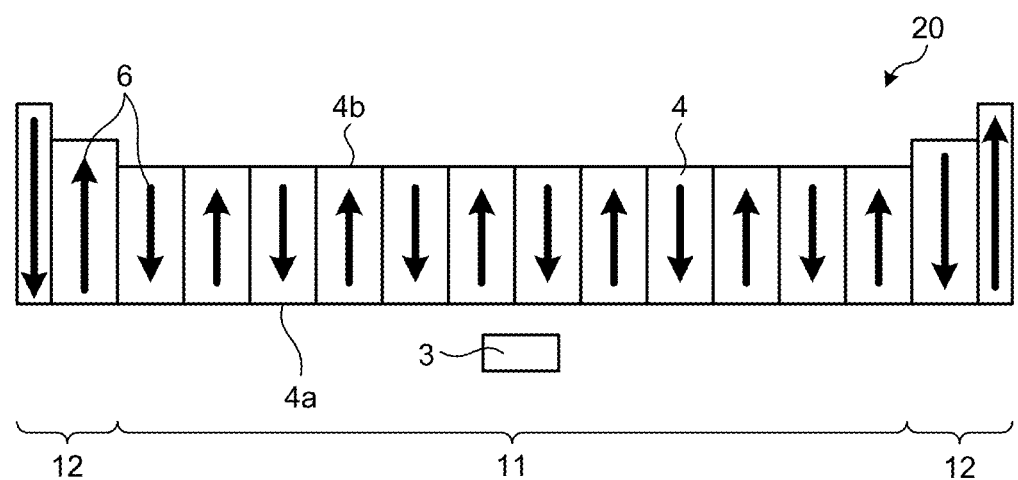
FIG. 10 is a diagram of the magnetic linear position detector according to a fifth modified example of the first embodiment as viewed along the Z axis.
Figure 10:
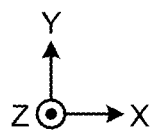

FIG. 10 is a diagram of the magnetic linear position detector according to a fifth modified example of the first embodiment as viewed along the Z axis. In the magnet 4 in the fifth modified example, the length of the magnetic poles in the width direction is shortened in the second regions 12 as the distance from the first region 11 in the width direction increases.

As a result, the width of the waveform of the magnetic field intensity illustrated in FIG. 5 can be narrowed. However, by shortening the length of the magnetic poles in the width direction, the magnetic field intensity at the ends may become smaller than the magnetic field intensity at the center portion. Therefore, in the fifth modified example, the magnetic poles protrude toward the second face 4b side in the second regions 12, and the length along the thickness direction is made longer than that in the first region 11. More specifically, in each second region 12, the length along the thickness direction from the magnetic pole on the first region 11 side to the magnetic pole at the end along the width direction is gradually lengthened for each magnetic pole. As a result, the stair-like step is provided in the portion that is the second face 4b of the magnet 4 and included in each second region 12.

According to the magnet 4 in the fifth modified example, in the second regions 12, the magnetic field intensity decreased by shortening the length along the width direction of the magnetic poles is reinforced by increasing the length along the thickness direction of the magnetic poles, and the magnetic field intensity and the width of the waveform are uniformized between the center portion and the ends of the magnet 4, whereby the accuracy of the position detection can be improved. Note that it is not necessary to shorten the length in the width direction of all the magnetic poles included in the second regions 12, and only the length in the width direction of the magnetic poles at the most ends along the width direction may be shortened.

In the above description, the magnetic linear position detector in which the stator is provided with the magnetic detector and the mover is provided with the magnet has been described as an example, but the stator may be provided with the magnet and the mover may be provided with the magnetic detector.

The configurations described in the above embodiments are merely examples and can be combined with other known techniques, the above embodiments can be combined with each other, and a part of the configurations can be omitted or changed without departing from the gist of the present disclosure.

REFERENCE SIGNS LIST 1 stator; 2 mover; 3 magnetic detector; 4, 40 magnet; 4a first face; 4b second face; 5, 6 arrow; 11 first region; 12 second region; 20 magnetic linear position detector.

The invention claimed is:

1. A magnetic linear position detector comprising:
a stator; and
a mover adapted to be movable along a first direction with respect to the stator, wherein
one of the stator and the mover includes a magnetic detector,
the other of the stator and the mover includes a magnet,
the magnet has a first face facing the magnetic detector, the first face being provided alternately with N poles and S poles along the first direction,
the magnet includes:
a first region; and
a second region provided adjacent to and on each side of the first region along the first direction,
in the first region, a length of the magnet along a second direction perpendicular to the first face is constant,
the second region includes a plurality of magnetic poles, and
in the second region, the length of the magnet along the second direction is gradually shortened for each of the plurality of magnetic poles, from a first magnetic pole in the plurality of magnetic poles on a side of the first region to a last magnetic pole in the plurality of magnetic poles at each end along the first direction such that a length in the second direction of each magnetic pole in the second region is shorter than a length in the second direction of an adjacent magnetic pole in the second region that is closer in the first direction to the first region.

2. The magnetic linear position detector according to claim 1, wherein
the magnet has a shorter length along the first direction of the magnetic pole at each end along the first direction than a length along the first direction of other magnetic poles.

3. The magnetic linear position detector according to claim 1, wherein
the first face of the magnet is a flat face.

4. The magnetic linear position detector according to claim 1, wherein
the magnet has a second face being a rear face of the first face, and the second face is a flat face.

5. The magnetic linear position detector according to claim 1, wherein
the magnet has different magnetic poles between a magnetic pole at one end and a magnetic pole at the other end.

6. The magnetic linear position detector according to claim 1, wherein
a length of the magnet in the second direction is constant within each of magnetic pole.

7. The magnetic linear position detector according to claim 1, wherein
an end magnetic pole in the second region has a front face arranged on a side of the end magnetic pole toward the magnetic detector and a rear face arranged on a side of the end magnetic pole away from the magnetic detector, the front face includes a flat portion and a chamfered portion,
a length in the second direction of the end magnetic pole in the second region at the flat portion is the same as the constant length of the magnet along the second direction in the first region, and a length in the second direction of the end magnetic pole in the second region at the chamfered portion is gradually reduced from the constant length as distance from the first region increases.

8. A magnetic linear position detector comprising:
a stator; and
a mover adapted to be movable along a first direction with respect to the stator, wherein
one of the stator and the mover includes a magnetic detector,
the other of the stator and the mover includes a magnet,
the magnet has a first face facing the magnetic detector, the first face being provided alternately with N poles and S poles along the first direction,
the magnet includes:
a first region; and
a second region provided on each side of the first region along the first direction,
in the first region, a length of the magnet along a second direction perpendicular to the first face is constant,
each second region includes only one magnetic pole,
the only one magnetic pole in each second region has a front face arranged on a side toward the magnetic detector and a rear face arranged on a side away from the magnetic detector, the front face includes a flat portion that extends along the first direction and a chamfered portion,
a length in the second direction along an entirety of the flat portion that extends along the first direction is the same as the constant length of the magnet along the second direction in the first region, and
a length in the second direction of the end magnetic pole in the second region at the chamfered portion is gradually reduced from the constant length as distance from the first region increases.

9. The magnetic linear position detector according to claim 8, wherein
the magnet has different magnetic poles between a magnetic pole at one end and a magnetic pole at the other end.

10. A magnetic linear position detector comprising:
a stator; and
a mover adapted to be movable along a first direction with respect to the stator, wherein
one of the stator and the mover includes a magnetic detector,
the other of the stator and the mover includes a magnet,
the magnet has a first face facing the magnetic detector, the first face being provided alternately with N poles and S poles along the first direction,
the magnet includes:
a first region; and
second regions provided on each side of the first region along the first direction, and each of the second regions extends from the first region to a corresponding end of the magnet,
in the first region, a length of the magnet along a second direction perpendicular to the first face is constant,
each of the second regions includes a plurality of magnetic poles, and
in each of the second regions, the length along the first direction of each pole in the plurality of magnetic poles included in the second region is reduced as the distance from the first region in the first direction increases, and
in each of the second regions, the length along the second direction of each pole in the plurality of magnetic poles included in the second region is longer than that in the first region.

11. The magnetic linear position detector according to claim 10, wherein
the first face of the magnet is a flat face.

12. The magnetic linear position detector according to claim 10, wherein
the magnet has different magnetic poles between a magnetic pole at one end and a magnetic pole at the other end.

* * * * *